Nov. 2, 1948.  H. R. RAFTON  2,453,099
TREATMENT OF CALCIUM SULFITE
Filed Oct. 4, 1943
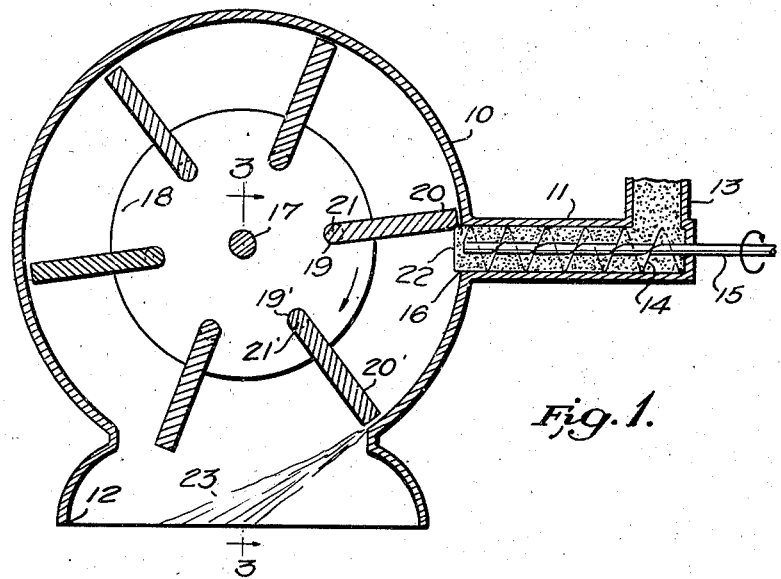
Fig. 1.
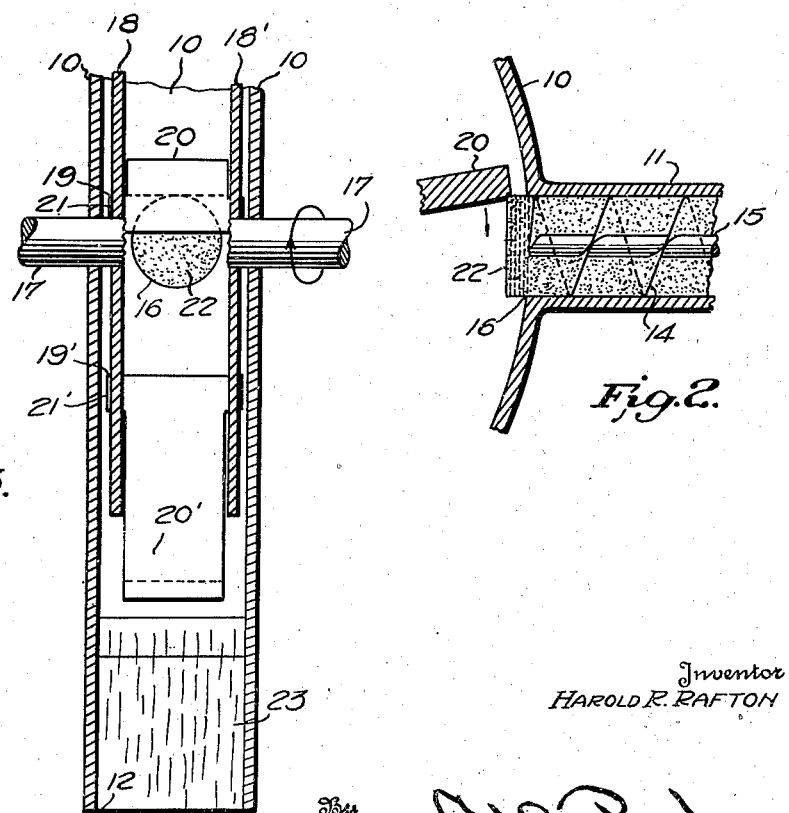
Fig. 2.
Fig. 3.
Inventor
HAROLD R. RAFTON
By
Attorney Patented Nov. 2, 1948

2,453,099

UNITED STATES PATENT OFFICE 2,453,099

TREATMENT OF CALCIUM SULFITE

Harold R. Rafton, Andover, Mass., assignor to Raffold Process Corporation, a corporation of Massachusetts Application October 4, 1943, Serial No. 504,921

14 Claims. (Cl. 23—129)

My invention relates to the treatment of calcium sulphite.

The principal object of my invention is the treatment of calcium sulphite to impart specific and controlled improved characteristics thereto.

A further object is the production of improved filled paper and coated paper with said treated calcium sulphite.

Other objects and advantages of my invention will become apparent during the course of the following description.

Calcium sulphite, as is well known, may be made in a number of ways, for example by the treatment of slaked lime or calcium carbonate with sulphur dioxide; by the precipitation of a soluble calcium salt such as calcium chloride with a soluble sulphite such as sodium sulphite; by the precipitation of a solution of calcium bisulphite as by reduction in pressure, or by boiling, or by addition of an alkali such as sodium hydroxide or slaked lime thereto; by the treatment of a mixture of calcium chloride and magnesia with sulphur dioxide; and the like; the formation of the calcium sulphite usually taking place in the presence of a greater or lesser amount of water.

In recent years calcium sulphite has come into commercial use as a filler for paper and as a coating pigment for paper. While it produces papers which have in general been acceptable to the trade, nevertheless certain properties of calcium sulphite are not all that could be desired to produce paper of the best quality. For example in coated paper, the calcium sulphite has a relatively high adhesive requirement, and a relatively high oil absorption; and moreover imparts a finish which is not as glossy as desired in many cases. In filled paper made therewith, the ink absorptive qualities are sometimes too high, the finish is sometimes irregular or not sufficiently glossy, and the feel not always as smooth as desired.

I have devised a process for treating calcium sulphite which overcomes to a large extent, if indeed it does not completely eliminate, the undesirable properties possessed by calcium sulphite and imparted by it to the paper made therewith. My process accomplishes this without any substantial detriment to the otherwise satisfactory properties of the calcium sulphite, such as whiteness, brightness and the like. In fact it even enhances these properties, particularly in coated paper, because of the lesser adhesive requirement as well as the greater ease of finishing.

In my copending applications Serial Nos. 449,492 filed July 2, 1942, and 543,469 filed August 3, 1942, now abandoned in favor, respectively, of my continuing application Serial No. 718,649, filed December 27, 1946, now Patent No. 2,447,532, issued August 24, 1948, and my continuation in part application Serial No. 740,831, filed April 11, 1947, now Patent No. 2,451,448, issued October 12, 1948, I have disclosed that by striking a pigment comprising calcium carbonate in association with water, in liquid form or in paste form respectively, with a striking surface of a rotating, i. e. rotor, element having a velocity of not less than substantially 30 feet per second, I am able to impart to said pigment, characteristics hitherto impossible of acquirement, or, if hitherto possible of acquirement by different methods, only at considerable expense or to a relatively minor degree; and I have produced pigment with modified and in some cases unique characteristics. I have also found that by the application of the treatment to calcium sulphite I am able similarly to modify said calcium sulphite, to impart to it highly desirable characteristics, and to produce greatly improved paper therewith.

I have described in detail in my above mentioned copending applications the equipment which I employ for carrying out my treatment and the disclosure of said applications is hereby made a part hereof for the purpose of cross reference. Briefly, my method comprises the subjecting of calcium sulphite in association with water in the form of a liquid or in the form of a paste, to the action of a striking surface of a moving element. Appreciable results are obtained when employing a velocity of not less than substantially 30 feet per second, but better results are obtained when employing higher velocities, usually not less than 100 feet per second and preferably at least 200 feet per second, or even better of 300 feet–500 feet or more per second. I find it most convenient to use a rotating element equipped with striking surface or surfaces, preferably a rotating element rotating at high speed. It is feasible to carry out my invention by the use of any one of a large variety of pieces of equipment, for example, by the use of a rotating element, for instance a cylinder, wheel or disc, but I prefer to use a disc because of its inherent strength at the high speeds desirable to employ. The rotating element may have as striking surface or surfaces, projections, serrations, indentations, teeth or the like on the periphery or on one or both end faces, or juts, blades, teeth or other striking surfaces may be arranged on the periphery of the rotating element, for example a disc similar to the arrangement of a steam turbine wheel, or juts, blades, teeth or other striking surfaces may be arranged on the end face or faces of the disc rather than on its periphery. The striking surfaces employed need not be an integral part of or rigidly attached to the rotating element, but may be attached as by pins, hinges or the like, and if desired, in certain cases, may swing out for example by centrifugal force. The disc referred to may be vertically disposed with its drive shaft in a horizontal plane or may be horizontally disposed with its drive shaft in a vertical plane or at any other angle desired. Because of the convenience of operation and the simplicity of the bearings required for the drive shaft of the disc, I prefer, however, to employ a disc disposed vertically, that is, with the shaft in a horizontal plane.

Although as stated, a variety of pieces of equipment will fulfill the requirements of my process, from the standpoint of economy and convenience, I prefer to use either a circular saw or a hammer mill. Of course the hammers of the hammer mill may be attached to more than one disc or the like, usually to two or more spaced on the drive shaft. The liquid or paste comprising the calcium sulphite may be subjected to the striking surfaces of the rotating element in bulk form if desired; or in jet or shaped form, either in a direction substantially opposed to that of the direction of advance of the leading faces of the striking surfaces, or otherwise, but preferably in a direction parallel to the leading faces, preferably in a plane of rotation of the rotating element from beyond the periphery thereof and directed toward its center of rotation. The leading faces of the striking surface or surfaces are preferably arranged radially in respect to the rotating element or come into that position when in operation. When using a liquid, I prefer to employ the type of machine described in my copending application Serial No. 479,373, filed March 16, 1943, now Patent No. 2,448,049, issued August 31, 1948, i. e., the so-called "Rafton mill"; and when using a paste I prefer to use a hammer mill, preferably fed from a feeding point or points in the periphery of the casing thereof, although such a feeding point or points is not essential. However, if desired, the hammer mill may be employed when using a liquid and the Rafton mill when using a paste. I may subject the calcium sulphite to only one passage through the apparatus employed, but usually improved results can be obtained by more than one passage or "pass," and thus I prefer to pass the calcium sulphite through the apparatus more than once, usually employing from five to twenty passes or more.

As indicated above, the preferred machines for carrying out my process are either a Rafton mill or a hammer mill. As the Rafton mill is described in great detail with adequate drawings in my copending application last above referred to, it is not necessary to include a drawing thereof herewith, but a drawing of a hammer mill suitable for carrying out my process is included to assist in a better understanding of my process. The accompanying drawing and detailed description thereof are intended to be illustrative only and not limiting. The drawing shows a hammer mill in which calcium sulphite, conveniently in paste form (although it may be in other form as indicated herein), is fed by a screw conveyor arranged substantially radially, the paste being extruded thereby directly into the path of the hammers and discharged through an opening in the mill casing. In this showing:

Figure 1 is a sectional view of a hammer mill, parts being shown in elevation,

Figure 2 is an enlarged sectional view, in fragmentary form, of that portion of Figure 1 adjacent the juncture of the inlet conduit and the hammer mill casing, and, Figure 3 is an enlarged sectional view, in fragmentary form, on line 3—3 of Figure 1.

Referring to Figure 1, casing 10 is provided with inlet conduit 11 and outlet 12. Inlet conduit 11 is fed by appropriate means such as inlet 13, shown in fragmentary form, connected thereto at its free end, and snugly houses screw conveyor 14 mounted on shaft 15, driveable in the direction of the surrounding arrow by any suitable means (not shown) and communicating through casing 10 by means of substantially circular aperture 16 therein. Through the casing 10 extends shaft 17 on which is mounted plate 18, which is rotatable in either direction as desired, but is here shown as rotating in a clockwise direction. (Plate 18 is one of two similar plates, spacedly mounted on shaft 17, the second of which is shown only in Figure 3.) In holes 19 in plate 18, hammers 20 are swiveled on their respective pins 21, each of which may be integral with its associated hammer 20.

In operation, as exemplified in Figure 1, shaft 17 is driven at high speed whereby plate 18, securely fixed thereto, is rotated, thereby in turn rotating at high speed hammers 20 which swing out by centrifugal force substantially along radial lines of plate 18. Paste 22 is introduced into inlet 13, advanced in inlet conduit 11 by means of screw conveyor 14, and extruded through aperture 16 substantially as a continuous mass of circular cross-section. Successive small portions or slices of this mass of paste 22 are struck off by rapidly rotating hammers 20, and are discharged through outlet 12 as discharged material 23 (shown diagrammatically). For greater efficiency, aperture 16 may be reduced in size to the form of a horizontal slot, thereby presenting a ribbon of paste instead of a mass of circular cross-section to the action of hammers 20. If a slurry is used as feed, screw conveyor 14 may still be employed, but it is not necessary and may be dispensed with and the slurry fed directly into inlet 13; or, if desired, inlet 13, inlet conduit 11 and screw conveyor 14, may all be dispensed with and the slurry fed into the path of the hammers e. g. under pressure as a jet, such as by a nozzle (not shown) tightly affixed in aperture 16.

Referring to Figure 2, the vertical dotted lines shown at the end of the extruded portion of the paste illustrate, diagrammatically, successive small portions or slices of paste struck off by the blow of successive hammers 20 as they pass in front of the aperture 16. It will be understood that the thickness of each successive portion struck off will depend upon the relative peripheral speed of the hammers 20 and of the advancing mass of extruded paste 22. If such mass of paste 22 advances relatively slowly with respect to the peripheral speed of the hammers 20, as is usually the case, the portions will be relatively thin, but if the paste advances relatively somewhat more quickly, the portions will be somewhat thicker.

In Figure 3, the dotted line shows the advancing edge of one of the hammers 20 at the point of striking the upper side of the paste 22 being extruded. Discharged material 23 from the previous hammer blow is shown, diagrammatically, as being discharged through outlet 12.

In my copending application Serial No. 455,367, filed August 19, 1942, the disclosure of which is made a part hereof for purpose of cross reference, I have disclosed that by striking a pigment comprising calcium carbonate in association with sufficient water to form a crumbly mass, with a striking surface of a rotating element having a velocity of not less than substantially 30 feet per second, I am able to impart to said pigment characteristics similar to those imparted by the processes of my two other copending applications first mentioned herein. I have also found that by the application of the treatment of application Serial No. 455,367 to calcium sulphite, I am able to modify said calcium sulphite similarly to the modification obtained when said calcium sulphite is treated in liquid or paste form. Cross reference is likewise made to my copending application Serial No. 584,158, filed March 22, 1945, also relating to the treatment of calcium carbonate. Applications Serial Nos. 455,367 and 584,158 have now been abandoned in favor of my application Serial No. 706,907, filed October 31, 1946, as a continuation in part of my said two prior applications. The amount of water required to produce a crumbly mass with calcium sulphite, varies with the particle size and other characteristics of the material, but usually when the resultant material contains from about 10% to about 20% of water, it exists in such condition, that is, in a condition in which the material is in crumbly form, but does not form a coherent whole. It will be understood that the crumbly condition exists throughout a range of water content which varies with conditions. With the addition of further water, the material is converted to a coherent plastic condition or paste. I may carry out my invention with calcium sulphite where enough water is present merely to form a crumbly solid, using for the purpose the equipment previously described, and conveniently a hammer mill. However, when thus treated, the material usually dries out rather rapidly during treatment, and thus requires the incorporation of further water to keep it in the crumbly condition, my process not being effective for modifying calcium sulphite when fed to a hammer mill in a dry powdery condition in bulk form. The calcium sulphite in crumbly form is thus more difficult to handle, especially when multiple passes are employed as is customarily the case. Thus the treatment of calcium sulphite with only sufficient water to convert it into the crumbly form is my non-preferred procedure, my preferred procedures being the treatment of said calcium sulphite either in a liquid or paste condition.

In the practice of my invention, I am able to change substantially the properties of calcium sulphite subjected thereto. For example, I can reduce the adhesive requirement from 10 to 70% or more, I can reduce the oil absorption from 10 to 50% or more, I can increase the gloss imparted to coated paper from 10 to 50% or more, and the like; and where in the claims I speak of effecting "a change in at least one of the properties of adhesive requirement, oil absorption and gloss-imparting qualities of said calcium sulphite of not less than one-tenth of the original value of said property," I mean that in the case of adhesive requirement or oil absorption that the change results in a reduction of not less than one-tenth of the original value of said respective property, and in the case of gloss-imparting quality that the change results in an increase of not less than one-tenth of the original value of said property.

I shall now illustrate the preferred procedures for practicing my invention.

I give the following example as illustrative of the results obtained in carrying out my process when calcium sulphite is used in association with water in the form of a thick liquid or slurry. Calcium sulphite made by action of sulphur dioxide on a slurry of slaked lime (the commonest commercial method of making calcium sulphite), was subjected to treatment in a Rafton mill. The calcium sulphite employed had an original dry content when the run was started of 36.2%, but it thickened slightly due to incorporation of air as the run proceeded, so that a little water was added during the run, and the final dry content was 29.75%. The addition of a little pine oil or other similar agent is useful in combatting this incorporation of air, but none was used in this run. The jet speed of the slurry treated in the run was about 86' per sec., the pressure of the pump supplying the slurry being approximately 70 lbs. per square inch. The velocity of the periphery of the rotating element employed, in this case the outer ends of the teeth of a circular saw, was 478' per second. The run was continued for 20 passes, samples being withdrawn at the intermediate passes and tested. The "casein requirement" and "oil absorption" were both determined by the methods customary in the art, referred to in detail in my copending application Serial No. 449,492, now abandoned. The "percent gloss of the coated paper" was determined by the Ingersoll glarimeter on paper coated with the pigment, after the coated paper had been calendered. The results are tabulated in Table I.

*Table I*

| No. of passes | Casein Requirement, per cent | Per cent reduction in casein requirement, based on original as 100% | Oil absorption | Percent reduction in oil absorption based on orig. as 100% | Per cent gloss of the coated paper |
|---|---|---|---|---|---|
| 0 (orig. sample) | 45 | | 50.2 | | 41.5 |
| 1 | 30 | 33 | 41.7 | 17 | 42 |
| 5 | 17 | 62 | 33.7 | 33 | 44.5 |
| 10 | 14 | 69 | 32.2 | 36 | 42 |
| 15 | 13 | 71 | 29.1 | 42 | 55 |
| 20 | 13 | 71 | 31.5 | 37 | 50 |

An examination of the data of Table I shows that treatment by my process has resulted in a very great reduction in casein requirement and oil absorption, as well as a marked improvement in gloss.

I give the following example as illustrative of the results obtained in carrying out my process when calcium sulphite is used in association with water in the form of a paste. The calcium sulphite was made by the same method as the sample used in the preceding run. It was subjected to treatment in a hammer mill. The calcium sulphite employed had an original dry content when the run was started of 45.8%, but owing to evaporation the paste became somewhat more concentrated as the run progressed, the final dry content being 61.6%. The paste was fed into the path of the hammers through an opening in the peripheral casing of the mill by a screw conveyor arranged radially. The velocity of the periphery of the rotating element employed, in this case the outer ends of the hammers, was 349' per sec. The run was continued for 10 passes, samples being withdrawn at the intermediate passes and tested. The various tests were made as previously described. The results thereof are tabulated in Table II.

*Table II*

| No. of passes | Casein Requirement, per cent | Per cent reduction in casein requirement, based on orig. as 100% | Oil absorption | Percent reduction in oil absorption based on orig. as 100% | Per cent gloss of the coated paper |
| --- | --- | --- | --- | --- | --- |
| 0 (orig. sample) | 43 |  | 54.1 |  | 34 |
| 1 | 25 | 42 | 32.0 | 41 | 32 |
| 5 | 13 | 70 | 29.1 | 46 | 49 |
| 10 | 13 | 70 | 27.6 | 49 | 54 |

An examination of the data of Table II, as of that of Table I, shows that treatment by my process has resulted in a very great reduction in casein requirement and oil absorption, as well as a marked improvement in gloss.

A comparison of Tables I and II indicates that results of approximately comparable magnitudes are obtained when calcium sulphite is processed either in liquid or paste form. However, it takes more passes to achieve the results in the liquid form, at least in the examples illustrated above. This latter is doubtless due to the fact that the calcium sulphite was present in a lower concentration in the liquid form than it was in the paste form, and the effectiveness of the treatment increases rapidly with increasing concentration. However, the efficiency of a Rafton mill (used in the run of Table I) in respect to power consumption is usually better than that of a hammer mill (used in the run of Table II), and thus the treatment in liquid form is not at the disadvantage which would be indicated by the greater number of passes required. Moreover, it is much easier to handle a liquid than a paste, and in many cases the over-all efficiency is found to be greater when treatment is carried out in liquid form. Thus the choice between treating in liquid or in paste form may well be determined by the condition in which the calcium sulphite originally exists, or in which it is desired to produce it for use, rather than on any preponderant economic advantage to be gained by treating in one or the other form.

It is, however, possible to improve considerably the efficiency of the treatment in liquid form by the use of a thinning agent, which has been referred to in my copending application Serial No. 449,492. This method consists in adding a small percentage of some material to the calcium sulphite in paste form, which acts to liquefy it. Modified starch, which is particularly effective for this purpose with calcium carbonate, does not seem to be effective with calcium sulphite. Casein solution, also effective with calcium carbonate, is moderately effective with calcium sulphite. Tetrasodium pyrophosphate and sodium silicate, effective with clay, are not very effective with calcium sulphite. The best thinning agent I have so far found is polymerized sodium salts of alkyl naphthalene sulphonic acids (alkyl long chain) known by the trade name of "Daxad No. 11." 1 or 2% or somewhat more of this, usually about 2%, is very effective in liquefying a calcium sulphite paste, so that even at a relatively high dry concentration a calcium sulphite paste may be reduced to liquid form and thus readily processed in a Rafton mill with a substantially higher efficiency as to number of passes and total power consumption than in the case of the run recorded in Table I. Thinning agents may also be used to soften a stiff paste of relatively high dry content to make it easier to handle.

Calcium sulphite as ordinarily manufactured commercially does not produce a product 100% pure, but usually one analyzing from about 80% to about 95% or more calcium sulphite according to the raw materials employed and the conditions of manufacture. The composition at the time of use depends also upon the care taken to prevent oxidation subsequent to manufacture. However, my treatment is effective to modify the properties of calcium sulphite, whether it be chemically pure or of the purity of the usual commercially manufactured grades, or indeed if it be mixed with other material so that it is present in percentages less than 80% in a pigment composition.

The calcium sulphite treated by my process may be utilized in coating mixes in the manner customary in the art, as the only pigment, or in connection with other coating pigment or pigments, with the proper amount of adhesive, and any other ingredients desired to be employed, and applied to either one or both sides of a paper web either on an ordinary coating machine, or on the paper machine itself by any of the devices used for the purpose. The coated paper so produced, in comparison with coated paper similarly produced from a similar grade of calcium sulphite, but untreated by my process, may be made with a lesser percentage of adhesive, is less absorbent of oil base inks, has a better finish, is whiter and brighter owing to the lesser adhesive required (particularly if the adhesive be one which has a tendency to lower the brightness and whiteness of the paper with increase in percentage used), and in general is of greatly improved quality and characteristics.

In the manufacture of filled paper, calcium sulphite treated by my process may be incorporated in the paper mix, with or without other pigments, in conjunction with any of the types of pulps ordinarily employed, together with other ingredients such as alum, size, starch, antioxidant or oxidation suppressing ingredient, and the like, in accordance with the type of paper to be made, and run off on the paper machine. The calcium sulphite may be added in the beater, or, if desired, later in the process as in the chest or the mixing box, or on the paper web, either on the wire or later on the paper machine. While time has not yet permitted the determination of the characteristics of the filled paper as thoroughly as those of the coated paper, the indications are that the filled paper so produced in which the calcium sulphite may be present anywhere from a few percent up to 30% or more if desired, is superior from the standpoint of feel, from the standpoint of finish, particularly in supercalendered paper, and also is less absorbent in certain cases of oil base printing inks. In general, it is superior to similar filled paper similarly produced with calcium sulphite which has not been treated by my process. This applies not only to ordinary filled paper but to filled paper which may be surface or tub sized on the paper machine.

In the illustrative runs in Tables I and II, I have shown a reduction in casein requirement of calcium sulphite treated by my process. This is the adhesive most widely used in coated paper. Similar percentage reduction in adhesive requirement of calcium sulphite treated by my process may be obtained with other adhesives employed in the coating industry, such as starch, either unmodified or more usually in modified form, glue, gums, or protein, proteinaceous, protein-like or protein-containing adhesive derived from other sources such as soya bean, corn (zein), or the like, casein (derived from milk) either in modified, combined or soluble form, as well as other materials useful as adhesives in coated paper.

The calcium sulphite after treatment by my process may be used in association with water in the condition in which it exists after treatment, or more water may be added thereto, or part of the water removed therefrom, prior to use. Moreover, it may be dried after treatment but before use, and then used dry, or after addition of water as desired.

My process is applicable to calcium sulphite of any particle size, from coarse down to the very finest, including that in colloidal condition. In the coarser particle sizes, there is usually some reduction in particle size brought about by my treatment, but in the finer particle sizes, my treatment has little or no effect on the particle size of the calcium sulphite which is subjected thereto. Regardless of particle size, however, and of method of manufacture of the calcium sulphite treated, the modification effected in the properties thereof by my process is similar.

My process is not only applicable to calcium sulphite in the liquid, paste, or crumbly condition in the wet form in which it is produced, or by removing some water therefrom but without drying the pigment, but it is also applicable to calcium sulphite which has been prepared in wet form and then dried, that is to say, the dried pigment may be wet up to form a liquid, paste or crumbly mass and then treated in my process.

As explained in detail in connection with my copending applications Serial Nos. 449,492, 453,469 and 455,367, my treatment may be conducted as a batch process or as a continuous process. Reference is made to those applications for information as to appropriate equipment in which either the batch or the continuous operation may be conducted. Inasmuch as a substantial proportion of the energy employed in my process is converted into heat, it is appropriate to take this into consideration in operating the process, as it may be desirable, in certain cases at least, to provide for cooling devices, preferably water jackets and the like. Of course, if for any reason it be desired, additional heat may be supplied. Also water may be added to compensate for evaporation. Moreover, if desired, appropriate means may be taken to limit the exposure of the calcium sulphite to air or other oxidizing agent, to eliminate or at least substantially reduce any tendency to oxidation which may exist. Also if desired my process may be carried out at superatmospheric or subatmospheric pressure, instead of at substantially atmospheric pressure, which is preferred.

Where I use in my process a liquid or paste comprising water and calcium sulphite, this liquid or paste may include a thinning agent, antifoam agent, other pigment or the like; and if the calcium sulphite is to be used as pigment for coating paper, any other ingredient used in a coating mix may be employed. Moreover a coating mix as such containing the desired amount of adhesive may be employed, but although this is satisfactory in some cases, usually it is not as efficient, because the concentration of the calcium sulphite is generally smaller in such mixes than the concentrations at which it may be more efficiently treated. Where I use in my process calcium sulphite containing sufficient water to convert it to a crumbly solid, I may have other material present therewith, if desired, providing the physical condition of the pigment is not substantially altered thereby.

I have not as yet determined the cause or causes of the outstanding modification of the properties of calcium sulphite brought about by its subjection to my process, but my theory is that it is due to some change which takes place in the surface characteristics of the individual particles. It may be that the physical, chemical, electrical or other condition of the calcium sulphite particles has been altered. While in certain cases as indicated above there may be some reduction in particle size, in other cases there is none, or substantially none, and my process is in no sense a grinding process per se, and if any comminution in particle size occurs, it is purely incidental and does not account for the modification in properties brought about in my process. Indeed, as to adhesive requirement and oil absorption, any decrease in particle size of a pigment is ordinarily accompanied by an increase in those properties, rather than a decrease.

It is, of course, well known to treat materials in hammer mills or the like to comminute them or break down aggregates therein; but as stated, this is not the process which I employ. Furthermore such comminution operations for the most part take place on dry material; and so far as I know, calcium sulphite has never been treated in the prior art in a hammer mill to change its properties, such as adhesive requirement and the like, nor has calcium sulphite in association with water been treated therein with the results disclosed herein. So far as I know, no one has ever observed that any such modification of properties could take place in treating calcium sulphite in the manner I treat it, prior to my invention thereof.

While I have described the use of my treated calcium sulphite in filled and coated paper, it is to be understood that it may be used to advantage in any other use to which calcium sulphite may be put, for example in cold water paints, or in other paints, enamels or coatings, or as a filler in rubber, rubber-like materials, plastics, putties or other articles of manufacture.

It is to be understood that my invention is not limited in any way by any theory expressed herein, or by its validity or invalidity, because regardless of any theory, the results are as stated herein.

While I have described in detail the preferred embodiments of my invention, it is to be understood that the details of procedure, the proportion of ingredients, the arrangement of steps, and the mechanical devices used, are presented for purposes of illustration only, and may be widely varied without departing from the spirit of my invention or the scope of the subjoined claims.

I claim:

1. In the treatment of calcium sulphite, the method of modifying said calcium sulphite to effect an improvement in at least one of the properties of adhesive requirement, oil absorption and gloss-imparting quality of said calcium sulphite, which comprises directing said calcium sulphite in association with water into the path of travel of a percussive member of a rotor element, subjecting said calcium sulphite to a percussion from said percussive member, said percussive member having a velocity of not less than 30 feet per second at the point of said percussion, said rotor element at the time of subjecting said calcium sulphite to the action of said percussive member being free from contact with said calcium sulphite except in respect to said percussive member, said calcium sulphite being free for movement upon, and at the point of, said percussion, said calcium sulphite being propelled by said percussive member away from and out of the path of travel of said percussive member.

2. A process according to claim 1 in which said percussive member has a velocity of not less than 100 feet per second at the point of said percussion.

3. A process according to claim 1 in which said percussive member has a velocity of not less than 200 feet per second at the point of said percussion.

4. A process according to claim 1 in which said percussive member has a velocity of not less than 400 feet per second at the point of said percussion.

5. A process according to claim 1 in which said calcium sulphite in association with water is in crumbly form.

6. A process according to claim 1 in which said calcium sulphite in association with water is in the form of a paste.

7. A process according to claim 1 in which said calcium sulphite in association with water is in the form of a slurry.

8. A process according to claim 1 in which said calcium sulphite in association with water is in the form of a slurry, and in which said slurry contains a thinning agent.

9. The method of modifying calcium sulphite which comprises directing said calcium sulphite in association with water, in the form of a paste, into the path of travel of hammers of a rotor element, subjecting said paste to percussions from said hammers, said hammers having a velocity of not less than 100 feet per second at the points of said percussions, said rotor element at the time of subjecting said paste to the action of said hammers being free from contact with said paste except in respect to said hammers, said paste being free for movement upon, and at the points of, said percussions, said paste being propelled by said hammers away from and out of the path of travel of said hammers, redirecting the thus treated paste into the path of travel of said hammers, and resubjecting it to the action of said hammers a sufficient number of times to effect a change in at least one of the properties of adhesive requirement, oil absorption and gloss-imparting quality of said calcium sulphite of not less than one-tenth of the original value of said property.

10. The method of modifying calcium sulphite which comprises directing said calcium sulphite in association with water into the path of travel of teeth of a circular saw, subjecting said calcium sulphite to percussions from said teeth, said teeth having a velocity of not less than 100 feet per second at the points of said percussions, said circular saw at the time of subjecting said calcium sulphite to the action of said teeth being free from contact with said calcium sulphite except in respect to said teeth, said calcium sulphite being free for movement upon, and at the points of, said percussions, said calcium sulphite being propelled by said teeth away from and out of the path of travel of said teeth, re-directing the thus treated calcium sulphite into the path of travel of said teeth, and resubjecting it to the action of said teeth a sufficient number of times to effect a change in at least one of the properties of adhesive requirement, oil absorption and gloss-imparting quality of said calcium sulphite of not less than one-tenth of the original value of said property.

11. The method of modifying calcium sulphite which comprises directing said calcium sulphite in association with water, into the path of travel of hammers of a rotor element, subjecting said calcium sulphite to percussions from said hammers, said hammers having a velocity of not less than 100 feet per second at the points of said percussions, said rotor element at the time of subjecting said calcium sulphite to the action of said hammers being free from contact with said calcium sulphite except in respect to said hammers, said calcium sulphite being free for movement upon, and at the points of, said percussions, said calcium sulphite being propelled by said hammers away from and out of the path of travel of said hammers, redirecting the thus treated calcium sulphite into the path of travel of said hammers, and resubjecting it to the action of said hammers a sufficient number of times to effect a change in at least one of the properties of adhesive requirement, oil absorption and gloss-imparting quality of said calcium sulphite of not less than one-tenth of the original value of said property.

12. The method of modifying calcium sulphite which comprises directing said calcium sulphite in association with water, in the form of a slurry, into the path of travel of teeth of a circular saw, subjecting said slurry to percussions from said teeth, said teeth having a velocity of not less than 100 feet per second at the points of said percussions, said circular saw at the time of subjecting said slurry to the action of said teeth being free from contact with said slurry except in respect to said teeth, said slurry being free for movement upon, and at the points of, said percussions, said slurry being propelled by said teeth away from and out of the path of travel of said teeth, redirecting the thus treated slurry into the path of travel of said teeth, and resubjecting it to the action of said teeth a sufficient number of times to effect a change in at least one of the properties of adhesive requirement, oil absorption and gloss-imparting quality of said calcium sulphite of not less than one-tenth of the original value of said property.

13. The method of modifying calcium sulphite which comprises directing said calcium sulphite in association with water, in the form of a slurry, said slurry constituting at least one jet, into the path of travel of percussive members of a rotor element, subjecting said slurry to percussions from said percussive members, said percussive members having a velocity of not less than 100 feet per second at the points of said percussions, said rotor element at the time of subjecting said slurry to the action of said percussive members being free from contact with said slurry except in respect to said percussive members, said slurry being free for movement upon, and at the points of, said percussions, said slurry being propelled by said percussive members away from and out of the path of travel of said percussive members, redirecting the thus treated slurry, constituting at least one jet, into the path of travel of said percussive members, and resubjecting it to the action of said percussive members a sufficient number of times to effect a change in at least one of the properties of adhesive requirement, oil absorption and gloss-imparting quality of said calcium sulphite of not less than one-tenth of the original value of said property.

14. The method of modifying calcium sulphite which comprises directing said calcium sulphite in association with water, in the form of a slurry, said slurry constituting at least one jet, into the path of travel of teeth of a circular saw, subjecting said slurry to percussions from said teeth, said teeth having a velocity of not less than 300 feet per second at the points of said percussions, said circular saw at the time of subjecting said slurry to the action of said teeth being free from contact with said slurry except in respect to said teeth, said slurry being free for movement upon, and at the points of, said percussions, said slurry being propelled by said teeth away from and out of the path of travel of said teeth, redirecting the thus treated slurry, constituting at least one jet, into the path of travel of said teeth, and resubjecting it to the action of said teeth a sufficient number of times to effect a change in at least one of the properties of adhesive requirement, oil absorption and gloss-imparting quality of said calcium sulphite of not less than one-tenth of the original value of said property.

HAROLD R. RAFTON.

REFERENCES CITED

The following references are of record in the file of this patent:

UNITED STATES PATENTS

| Number | Name | Date |
|---|---|---|
| 429,625 | Hoffman | June 10, 1890 |
| 1,711,464 | Rupprecht et al. | Apr. 30, 1929 |
| 1,832,416 | O'Brien | Nov. 17, 1931 |
| 1,872,891 | Church | Aug. 23, 1932 |
| 1,984,188 | Haywood | Dec. 11, 1934 |
| 2,182,096 | Roderick | Dec. 5, 1939 |
| 2,210,405 | Haywood | Aug. 6, 1940 |
| 2,210,835 | Jones et al. | Aug. 6, 1940 |
| 2,323,877 | Turbett | July 6, 1943 |